Patented Jan. 28, 1947

2,414,812

UNITED STATES PATENT OFFICE 2,414,812

CATALYSIS

Eugene J. Houdry, Ardmore, Pa., assignor to Houdry Process Corporation, Wilmington, Del., a corporation of Delaware No Drawing. Application November 25, 1942, Serial No. 466,921

15 Claims. (Cl. 196—52)

This invention relates to catalysis and to contact masses for promoting, controlling or assisting in the direction and extent of organic reactions conducted on a commercial scale and on an adiabatic basis in successive reactions which complement one another so that the contact mass is continuously maintained within the temperature range suitable for the reactions without requiring an extraneous heating or cooling fluid to be circulated through or around the reaction chamber. Typical reactions, as well as contact masses, for promoting the same are disclosed in my copending application Serial No. 439,338, filed April 17, 1942, of which the present application is a continuation in part.

The contact mass of the present invention is made up of active and inactive parts in uniform distribution. An important characteristic of the mass is its high specific heat per volume of mass which enables the latter to absorb or to store up heat which can be subsequently released, as desired or required, during the complementary reactions, such as an endothermic on-stream reaction to produce desired products followed by an exothermic oxidizing or regenerating reaction to clear the contact mass of contaminating deposits and to restore the activity of the catalyst.

In preparing to conduct a catalytic operation in an adiabatic cycle of alternating on-stream and regenerating reactions, the first essential is to determine how the material to be charged to the operation cracks, dehydrogenates or is otherwise affected by the cotalyst under a series of differing temperatures. With this information the desired mean temperature or operating range of temperatures for the on-stream reaction is selected. The contact mass is then selected, due consideration being given to the heat of the reaction and the quantity of coke or other burnable material per volume of catalyst mass needed to produce the proper quantity of heat during regeneration. It has been found that the volumetric ratio of active catalyst to inactive heat absorbing material will be in the range of 1:5 to 3:1, depending upon the specific heat and the weight of the inactive material as compared with the same characteristics of the active catalytic material, preferred ratios being 1:3 to 3:2. Any known or suitable catalysts may be utilized. For cracking operations silicious catalysts are suitable, such as blends or compounds of silica and alumina, silica and zirconia, etc., of natural or artificial origin, with or without the inclusion of other active components, such as metals or metallic compounds, etc. For dehydrogenating operations the usual dehydrogenating catalysts, such as chromium, molybdenum, vanadium, iron, nickel, etc. may be utilized. The catalytic materials alone or on supports are usually independent of the inactive material which stores heat; the active and inactive materials being mixed in a substantially uniform manner to form the contact mass.

The heat absorbing material should be capable of withstanding elevated temperatures, as of the order of 2000° F. Certain fused materials have been found to be especially desirable for the heat absorbing component of the contact mass because of their resistance to high temperature, their high density and specific heat characteristics and because they have little or no catalytic activity. The preferred materials have a density of at least 3 and specific heat of at least .25 so as to give high heat capacity. A number of them are commercially available and relatively inexpensive. Among the desirable ones are the following:

| | Density | Specific heat | Heat capacity expressed as gram-calories per liter (solid) per degree C. |
|---|---|---|---|
| Fused alumina (trade-names aloxite, Alundum) | 3.95 | 0.31 | 1250 |
| "Corhart" refractory material (about 70% alumina, the remainder largely silica, product of Corhart Refractories Company) | 3.25 | 0.27 | 880 |
| Magnesite brick | 3.5 | 0.31 | 1070 |
| Dead burned magnesite ore | 3.1 | 0.31 | 950 |
| Chrome brick | 3.95 | 0.29 | 1140 |

For comparison attention is directed to the following metals and their properties:

| | Density | Specific heat | Heat capacity expressed as gram-calories per liter (solid) per degree C. |
|---|---|---|---|
| Iron metal | 7.7 | 0.17 | 1310 |
| Aluminum metal | 2.7 | 0.26 | 700 |

Also, to other typical materials, some of which are commercially available materials, as follows:

| | Density | Specific heat | Heat capacity expressed as gram-calories per liter (solid) per degree C. |
|---|---|---|---|
| Silica brick | 2.35 | 0.32 | 760 |
| Fireclay brick | 2.60 | 0.26 | 680 |
| Ganister (quartz) | 2.6 | 0.31 | 800 |

Also, to certain prepared materials, such as:

| | Heat treatment | Density | Specific heat | Heat capacity expressed as gram-calories per liter (solid) per degree C. |
|---|---|---|---|---|
| 40% bentonite, 60% kaolin | 1400° F. for 2 hrs | 1.7 | 0.26 | 440 |
| 20% bentonite, 80% kaolin | 1400° F. for 2 hrs | 1.64 | 0.26 | 425 |
| 10% bentonite, 40% kaolin, 50% iron | 1400° F. for 2 hrs | 2.33 | 0.21 | 490 |
| 10% bentonite, 40% kaolin, 50% $Fe_3O_4$ | 1400° F. for 2 hrs | 2.13 | 0.26 | 530 |

The heat capacities listed above are at 540° C. (1000° F.) and are the true measure of comparison between materials since they express the amount of heat stored in a unit volume of the material.

From the above it will be noted that the preferred materials have a density in the range of 3 to about 4, specific heat in the range of .25 to about .35 and heat capacity expressed in gram-calories per liter per degree C. in the range of 850 to about 1300.

The catalyst and the heat absorbing material may be in finely divided form and thoroughly mixed in the proper volumetric ratio when the operation is to be conducted with a moving bed of contact material. Both the catalytic material and the heat exchange material may be in the form of particles, bits, fragments, lumps or molded pieces when the contact mass is to be used for static bed catalytic operations. Since most catalysts manifest a gradual loss of activity over long periods of use which eventually requires that the catalyst be discarded for new catalyst, it is desirable to have the catalytic material and the heat absorbing material of different sizes, so that at the time of catalyst renewal a division of the mass into active and inactive parts may be effected without difficulty, as by a simple screening operation. In most instances, it is immaterial whether the catalyst or the inert component is the larger, provided there is not so great disparity in size that substantial uniformity of distribution of the catalyst throughout the mass cannot be attained. For a static bed operation 2 mm. and 4 mm. sizes or 10 mesh and 4 mesh fragments or pieces are convenient to use. For the adiabatic cycle to function it is essential that the active catalytic material, which acquires the burnable deposit and which consequently rises in temperature during regeneration, be surrounded by or close to the inert material which acquires little if any burnable deposit and which consequently rises in temperature only as it absorbs heat from the burning of the deposit on the catalyst. Hence the inert material acts as a cooling wall during the regenerating periods and as a heating wall during the on-stream periods of the adiabatic cycle. Thus the relative size of the particles or pieces of the active and inactive components of the contact mass is important since it affects quite directly the uniformity of mixing of the components.

By suitable control of operating conditions and of coke deposit it has been found to be entirely feasible to operate on a commercial scale and for extended periods in adiabatic cycle with composite materials of the type disclosed above within an overall range of about 150° F., or less, at temperatures above 700° F. As indicated in my aforesaid copending application exemplary operations include: refining and desulphurizing operations on petroleum distillates in the range of 750° to 850° F., or with a mean temperature of about 800° F.; dehydrogenating and cracking operations to produce lighter hydrocarbons such as motor fuel, aviation fuel, etc. from heavier hydrocarbons in the range of 850 to 975° F., or with a mean temperature of about 925° F.; more drastic dehydrogenating or cracking operations, as to produce gases, especially of the unsaturated or olefinic type, can be conducted in the range of 975 to 1075° F. (mean temperature about 1025° F.) or even higher as in the range of 1075 to 1175° F. (mean temperature about 1125° F. etc.).

For continuous operation in an adiabatic cycle two converters are needed, one for the on-stream operation and the other for the regenerating operation when the regenerating periods for these operations are the same length. The converters may be of any known or desired type; suitable ones being shown in my copending application Serial No. 437,687, filed April 4, 1942, as well as in my aforesaid copending application Serial No. 439,338. When the regenerating periods are longer than the on-stream period additional converters will be required for a static bed operation or a larger converter for the regeneration operation in moving bed catalytic operations. Once the operating conditions have been established and a converter has been brought to temperature, adequate heat storage capacity in the inert portion of the contact mass controls the temperature swing of the mass in the cycles of on-stream and regenerating reactions and makes it uniform and regular. Any variations are slight, merely a degree or two per cycle, so that any necessary adjustment will be infrequent and easily made, as by changing the entering temperatures of the reactants, by modifying the feed rate or rates or composition of the reactants, etc.

While metals, such as iron, steel, aluminum etc. present a high degree of heat capacity per volume of space occupied they often have a catalytic effect which is detrimental. When iron and steel are used iron oxide tends to be formed which has a very adverse effect upon the activity of many catalysts. By selecting the heat absorbing component of the contact mass from the group fused alumina, magnesite brick, dead burned magnesite ore, "corhart" and chrome brick, adequate heat storage capacity is attained by reason of the density, specific heat and high heat capacity of these materials and in addition there is slight, if any, adverse catalytic effect on the reaction.

A great variety of organic reactions including but not limited to cracking or dehydrogenation of hydrocarbons can be advantageously effected with the aid of the composite contact masses disclosed herein at temperatures ranging upwardly from 700° F. The charging stocks are sent to the reaction zone in vapor phase under suitable pressure conditions which may range from high vacuum for certain dehydrogenation operations, as in the production of unsaturates such as butadiene in the manufacture of synthetic rubber, to substantial superatmospheric pressure as in the production of base stock for aviation fuels of superior grade. It is to be understood that the present invention covers all variations, modifications and adaptations within the scope of the appended claims.

I claim as my invention:

1. Contact mass for catalytic hydrocarbon reactions conducted in a cycle of endothermic on-stream and exothermic regenerating operations comprising a substantially uniformly distributed mixture of discrete pieces of catalytic material and heat absorbing material of artificially fused oxide, said heat absorbing material being capable of withstanding elevated temperatures of the order of 2000° F., the volumetric ratio of catalyst to heat absorbing material being in the range of 1:5 to 3:1, the heat absorbing material having a density of at least 3 and specific heat of at least .25 and differing sufficiently in size from the catalytic material to permit segregation by screening.

2. A contact mass in accordance with claim 1 in which the heat absorbing material comprises fused alumina.

3. A contact mass in accordance with claim 1 in which the heat absorbing material comprises fused magnesite.

4. A contact mass in accordance with claim 1 in which the heat absorbing material comprises chrome brick.

5. Contact mass for effecting organic reactions in a cycle of endothermic on-stream and exothermic regenerating operations at elevated temperatures above 700° F. comprising a substantially uniform mixture of catalyst pieces and of pieces of relatively inert heat absorbing material of artificially fused oxide capable of withstanding elevated temperatures of the order of 2000° F., in volumetric ratio of 1:5 to 3:1, the density of the inert material being in the range of 3 to about 4 and its specific heat in the range of .25 to .35, the pieces of said heat absorbing material differing sufficiently in size from the pieces of catalyst to facilitate separation by a screening operation.

6. Process of effecting catalytic reactions in a cycle of alternating endothermic and exothermic operations under controlled temperature conditions which comprises contacting an organic compound with a contact mass maintained at temperatures in excess of 700° F. and consisting of discrete pieces of active catalytic material capable of effecting the desired catalytic reaction substantially uniformly mixed with discrete pieces of a relatively inactive fused heat absorbing material having a density in the range of 3 to 4, a specific heat in the range of .25 to .35, capable of withstanding elevated temperatures of the order of 2000° F., and differing sufficiently in size from the catalytic material to permit segregation by screening, the volumetric ratio of active catalytic material to inactive heat absorbing material in the contact mass being within the range of 1:5 to 3:1.

7. Process of effecting catalytic hydrocarbon reactions in an adiabatic cycle of endothermic on-stream and exothermic regenerating operations which comprises contacting hydrocarbons with a contact mass maintained at temperatures in excess of 700° F. and consisting of discrete pieces of active catalytic material capable of effecting the desired catalytic reaction of the hydrocarbons substantially uniformly mixed with discrete pieces of a relatively inactive fused heat absorbing material having a density of at least 3, capable of withstanding elevated temperatures of the order of 2000° F., and differing sufficiently in size from the catalytic material to permit segregation by screening, the volumetric ratio of active catalytic material to inactive heat absorbing material in the contact mass being within the range of 1:5 to 3:1.

8. Contact mass for effecting endothermic catalytic organic reactions alternating with exothermic regenerating reactions comprising a substantially uniformly distributed mixture of discrete pieces of catalytically active material and heat absorbing solid, said heat absorbing solid having density of at least 3, heat capacity expressed in gram-calories per liter per degree centigrade of at least 850, and being capable of withstanding temperature of the order of 2000° F., the exposed surfaces of said heat absorbing solid being artificially fused and substantially inert oxide.

9. Contact mass of effecting endothermic catalytic organic reactions alternating with exothermic regenerating reactions comprising a substantially uniformly distributed mixture of discrete pieces of catalytically active material and heat absorbing solid, said heat absorbing solid having density of at least 3, heat capacity expressed in gram-calories per liter per degree centigrade of at least 850, and being capable of withstanding temperature of the order of 2000° F., the exposed surfaces of said heat absorbing solid being substantially insert and comprising fused alumina.

10. The process of effecting catalytic reactions in a cycle of alternating endothermic and exothermic operations at controlled temperature above 700° F. which comprises contacting an organic compound with a contact mass maintained at desired temperature which is a substantially uniformly distributed mixture of discrete pieces of catalytically active material and heat absorbing solid, said heat absorbing solid having density of at least 3, heat capacity expressed in gram-calories per liter per degree centigrade of at least 850, and being capable of withstanding temperature of the order of 2000° F., the exposed surfaces of said heat absorbing solid being artificially fused and substantially inert oxide.

11. The process of effecting catalytic reactions in a cycle of alternating endothermic and exothermic operations at controlled temperature above 700° F. which comprises contacting an organic compound with a contact mass maintained at desired temperature which is a substantially uniformly distributed mixture of discrete pieces of catalytically active material and heat absorbing solid, said heat absorbing solid having density of at least 3, heat capacity expressed in gram-calories per liter per degree centigrade of at least 850, and being capable of withstanding temperature of the order of 2000° F., the exposed surfaces of said heat absorbing solid being artificially fused and substantially inert oxide comprising alumina.

12. Contact mass for effecting endothermic hydrocarbon reactions alternating with exothermic regenerating reactions comprising a substantially uniformly distributed mixture of discrete pieces of catalyst and substantially inert heat absorbing solid in volumetric ratio of at least 1:5, said mixture being catalytically active in promoting at temperature above 700° F. hydrocarbon decomposition reactions, said heat absorbing solid being capable of withstanding temperature of the order of 2000° F., having density of at least 3, and heat capacity expressed in gram-calories per liter per degree centigrade of at least 850, and the exposed surfaces of said heat absorbing solid being substantially inert artificially fused oxide.

13. Contact mass for effecting endothermic hydrocarbon reactions alternating with exothermic regenerating reactions comprising a substantially uniformly distributed mixture of discrete pieces of catalyst and substantially inert heat absorbing solid in volumetric ratio of at least 1:5, said mixture being catalytically active in promoting at temperature above 700° F. hydrocarbon decomposition reactions, said heat absorbing solid presenting substantially inert exposed surfaces and being capable of withstanding temperature of the order of 2000° F., having density of at least 3 and heat capacity expressed in gram-calories per liter per degree centigrade of at least 850, and being artificially fused oxide comprising alumina.

14. The process of effecting catalytic reactions in a cycle of alternating endothermic hydrocarbon reactions and exothermic regeneration at controlled temperature above 700° F. which comprises contacting hydrocarbon charge with a catalytically active contact mass maintained at desired temperature which is a substantially uniformly distributed mixture of discrete pieces of catalyst for endothermic hydrocarbon conversion and of heat absorbing solid in volumetric ratio of at least 1:5, said heat absorbing solid presenting substantially inert exposed surfaces and being capable of withstanding temperature of the order of 2000° F., having density of at least 3 and heat capacity expressed in gram-calories per liter per degree centigrade of at least 850, and being artificially fused oxide.

15. The process of effecting catalytic reactions in a cycle of alternating endothermic hydrocarbon reactions and exothermic regeneration at controlled temperature above 700° F. which comprises contacting hydrocarbon charge with a catalytically active contact mass maintained at desired temperature which is a substantially uniformly distributed mixture of discrete pieces of catalyst for endothermic hydrocarbon conversion and of heat absorbing solid in volumetric ratio of at least 1:5, said heat absorbing solid being capable of withstanding temperature of the order of 2000° F., having density of at least 3 and heat capacity expressed in gram-calories per liter per degree centigrade of at least 850, and the exposed surfaces of said heat absorbing solid being substantially inert artificially fused oxide comprising alumina.

EUGENE J. HOUDRY.